(12) United States Patent
Omae et al.

(10) Patent No.: US 10,800,362 B2
(45) Date of Patent: Oct. 13, 2020

(54) VENTILATION MEMBER AND HARNESS

(71) Applicant: SUMITOMO WIRING SYSTEMS, LTD., Yokkaichi-shi, Mie (JP)

(72) Inventors: Hikaru Omae, Yokkaichi (JP); Tomohiro Yabashi, Yokkaichi (JP); Takao Kushima, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/479,033

(22) PCT Filed: Jan. 12, 2018

(86) PCT No.: PCT/JP2018/000588
§ 371 (c)(1),
(2) Date: Jul. 18, 2019

(87) PCT Pub. No.: WO2018/135389
PCT Pub. Date: Jul. 26, 2018

(65) Prior Publication Data
US 2019/0329725 A1    Oct. 31, 2019

(30) Foreign Application Priority Data
Jan. 20, 2017    (JP) .................................. 2017-008599

(51) Int. Cl.
*B60R 16/03*    (2006.01)
*H02G 3/03*    (2006.01)
(Continued)

(52) U.S. Cl.
CPC ............... *B60R 16/03* (2013.01); *H02G 3/03* (2013.01); *H02G 3/0406* (2013.01)

(58) Field of Classification Search
CPC ...... B60R 11/00; B60R 11/0235; B60R 16/02; B60R 16/0215; B60R 16/023; B60R 1/00;
(Continued)

(56) References Cited

U.S. PATENT DOCUMENTS

| 790,644 | A | * | 5/1905 | Lloyd | ................... | B21D 39/04 |
|---|---|---|---|---|---|---|
| | | | | | | 29/890.14 |
| 3,455,336 | A | * | 7/1969 | Ellis | ................... | H02G 15/1813 |
| | | | | | | 138/156 |

(Continued)

FOREIGN PATENT DOCUMENTS

| JP | S62-043854 | * | 3/1987 | ............... H02G 3/04 |
|---|---|---|---|---|
| JP | S62-043854 U | | 3/1987 | |
| JP | 2004-266211 A | | 9/2004 | |

OTHER PUBLICATIONS

Feb. 20, 2018 International Search Report issued in International Patent Application No. PCT/JP2018/000588.

*Primary Examiner* — Binh B Tran
*Assistant Examiner* — Krystal Robinson
(74) *Attorney, Agent, or Firm* — Oliff PLC

(57) ABSTRACT

A ventilation member that includes an attachment that can be attached to an electric wire insertion tube having a first through hole; and a connection body that is arranged on the attachment and is connected to the first through hole, wherein the connection body has ventilation that allows air to pass therethrough and is unlikely to allow water to pass therethrough, a first connection that can be connected to a second through hole with a first diameter, and a second connection that can be connected to a third through hole with a second diameter that is smaller than the first diameter, and the first connection and the second connection are arranged along a projecting direction of the connection body.

5 Claims, 3 Drawing Sheets

(51) Int. Cl.
*H02G 3/04* (2006.01)
*B60R 13/00* (2006.01)

(58) Field of Classification Search
CPC . B60R 2011/0026; B60R 16/00; B60R 16/03;
F16L 3/1091; F16L 3/2235; F16L 57/04;
F16L 5/04; H01B 7/295; H01B 7/42;
H01B 7/00; H02G 15/013; H02G 15/08;
H02G 3/04; H02G 3/0418; H02G 3/03
See application file for complete search history.

(56) References Cited

U.S. PATENT DOCUMENTS

| | | | | |
|---|---|---|---|---|
| 3,991,243 | A * | 11/1976 | Biddell | B29C 61/10 |
| | | | | 428/61 |
| 5,914,415 | A * | 6/1999 | Tago | B01D 19/0031 |
| | | | | 55/385.4 |
| 7,189,918 | B2 * | 3/2007 | Sakata | B60R 16/0239 |
| | | | | 174/17 VA |
| 9,093,765 | B2 * | 7/2015 | Kuji | H01R 13/193 |
| 9,302,635 | B2 * | 4/2016 | Han | H02G 15/013 |
| 10,128,643 | B2 * | 11/2018 | McDonald | H01B 7/0045 |
| 2010/0219305 | A1 * | 9/2010 | Lloyd | B60R 11/00 |
| | | | | 248/201 |
| 2015/0101842 | A1 | 4/2015 | Han et al. | |
| 2016/0020000 | A1 * | 1/2016 | Doushita | F16B 21/086 |
| | | | | 174/72 A |
| 2016/0021730 | A1 * | 1/2016 | Decker | H05K 1/0207 |
| | | | | 361/720 |
| 2016/0164269 | A1 * | 6/2016 | Inao | H02G 3/0468 |
| | | | | 174/68.3 |
| 2016/0363102 | A1 * | 12/2016 | Wirojpaisit | F02M 35/10249 |
| 2018/0361083 | A1 * | 12/2018 | Casey | B05B 17/0646 |

\* cited by examiner

VENTILATION MEMBER AND HARNESS

This application is the U.S. National Phase of PCT/JP2018/000588 filed Jan. 12, 2018, which claims priority to JP 2017-008599 filed Jan. 20, 2017, the entire disclosure of which is incorporated herein by reference.

BACKGROUND

The present disclosure relates to a ventilation member that can be attached to a protective tube, and a harness including the ventilation member.

Electric wires are covered by protective tubes for the purpose of protection from water intrusion, dust, or the like. Since electric wires are arranged in various forms, protective tubes are configured as members obtained by coupling a plurality of types of tubes with different structures. For example, a protective tube includes an external cover for protecting a middle portion of an electric wire excluding end portions thereof, and a waterproof cover made of rubber for protecting a portion between the external cover and a connector. Such a protective tube seals a portion between connectors at both ends of an electric wire, and thus the internal pressure of the protective tube may increase due to a change in atmospheric pressure or the like. In order to suppress an increase in the internal pressure, a waterproof cover includes a ventilation device. The ventilation device includes an ventilation filter that is air permeable while having waterproof and dustproof functions (see JP 2013-241143A).

SUMMARY

Incidentally, as described in JP 2013-241143A, a ventilation device is conventionally arranged on a waterproof cover. Thus, a ventilation portion of a protective tube is located only at a portion around a connector. Since a harness is attached in various forms, it is preferable that the arrangement of a ventilation portion on a protective tube is less limited. Accordingly, there is room for improvement in the structure of a ventilation portion on a protective tube.

(1) A ventilation member according to an exemplary aspect includes: an attachment that can be attached to an electric wire insertion tube having a first through hole; and a connection body that is arranged on the attachment and is connected to the first through hole, wherein the connection body has a ventilation that allows air to pass therethrough and is unlikely to allow water to pass therethrough.

With this configuration, the ventilation can be attached to the first through hole of the electric wire insertion tube. Thus, the ventilation can be arranged at the portion of the protective tube at which the first through hole is arranged. That is to say, the ventilation can be arranged at portions other than a portion around the connector.

(2) In the above-described ventilation member, the connection body includes an insertion that is inserted through the first through hole of the electric wire insertion tube, and a catch that projects from the insertion and engages with an inner face of the electric wire insertion tube.

With this configuration, the ventilation is unlikely to separate from the electric wire insertion tube.

(3) In the above-described ventilation member, the connection body includes a first connection that can be connected to a second through hole with a first diameter, and a second connection that can be connected to a third through hole with a second diameter that is smaller than the first diameter, and the first connection and the second connection are arranged along a projecting direction of the connection body.

With this configuration, the ventilation can be attached to the electric wire insertion tube having the second through hole with the first diameter, and to the electric wire insertion tube having the third through hole with the second diameter.

(4) In the above-described ventilation member, the connection body includes a first catch that projects from the first connection and engages with an inner face of the electric wire insertion tube having the second through hole with the first diameter, and a second catch that projects from the second connection and engages with an inner face of the electric wire insertion tube having the third through hole with the second diameter.

With this configuration, the ventilation member is unlikely to separate from the electric wire insertion tube.

(5) In the above-described ventilation member, the ventilation member further includes a spacer that is arranged between the attachment and the electric wire insertion tube having the third through hole with the second diameter, wherein the spacer has a fitting hole into which the first connection is fitted, and can be attached to the electric wire insertion tube having the third through hole with the second diameter.

With this configuration, the ventilation member can be attached to the electric wire insertion tube via the spacer. Accordingly, it is possible to suppress the wobbling of the ventilation member that occurs when the ventilation member is attached to the electric wire insertion tube having the third through hole with the second diameter.

(6) A harness that solves the above-described problems includes: any one of the above-described ventilation member; an electric wire insertion tube including the ventilation; and an electric wire that is inserted through the electric wire insertion tube.

With this configuration, air can be allowed to flow between the inside and the outside of the electric wire insertion tube at the portion of the harness to which the ventilation member is attached.

With the ventilation member according to some modes of the present disclosure, the degree of freedom in arranging the ventilation in the harness can be increased. The harness according to some modes of the present disclosure has a high degree of freedom in arrangement.

DETAILED DESCRIPTION OF EMBODIMENTS

First Embodiment

Hereinafter, a harness 1 will be described with reference to FIGS. 1 to 4. The harness 1 electrically connects two or three or more electrical devices. Examples of the electrical devices include a vehicle drive motor, a motor of various types of electrical equipment mounted on a vehicle, a power source device, and the like.

Figure 1:
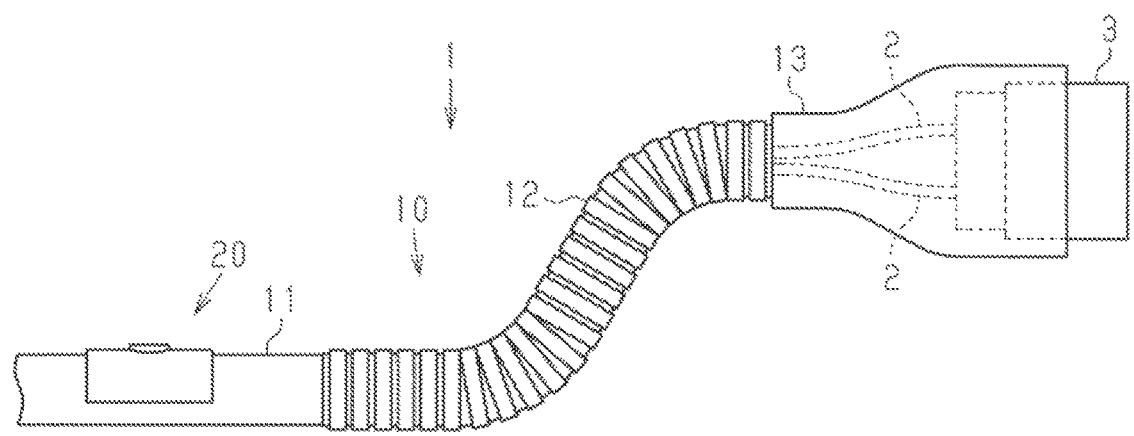
FIG. 1 is a schematic view of a harness according to a first embodiment.

As shown in FIG. 1, the harness 1 includes one or a plurality of electric wires 2 coated by resin, a connector 3 that is connected to an end of the electric wires 2, and a protective tube 10 that protects the electric wires 2. The casing of the connector 3 is conductive. The protective tube 10 protects the electric wires 2 from flying objects, water, and the like. For example, if the electric wires 2 are mounted on vehicle without protective tubes, flying rocks (flying objects) may hit the electric wires 2 and damage the coating during driving. In order to suppress such damage and the like to the electric wires 2, the electric wires 2 are protected by the protective tube 10.

The protective tube 10 includes an electric wire insertion tube 11 that covers the electric wires 2, a corrugated tube 12 that is connected to the electric wire insertion tube 11, and a waterproof cover 13 that connects the connector 3 attached to the electric wires 2 and the corrugated tube 12. Note that the waterproof cover 13 may be referred to as a grommet. The electric wire insertion tube 11 has a rigidity that is unlikely to allow the electric wire insertion tube 11 to be bowed. A cross-section of the electric wire insertion tube 11 (a cross-section that is perpendicular to an extending direction DY of the electric wire insertion tube 11) has, for example, a circular outer shape.

The electric wire insertion tube 11 and the corrugated tube 12, the corrugated tube 12 and the waterproof cover 13, and the waterproof cover 13 and the connector 3 are each fastened to each other using a band or tape (not shown). The waterproof cover 13 is made of, for example, rubber or elastomer. The corrugated tube 12 is made of a resin. The electric wire insertion tube 11 is made of, for example, a metal or a resin. The electric wire insertion tube 11 includes a through hole 11a that is formed through a tube wall constituting the electric wire insertion tube 11.

Figure 2:
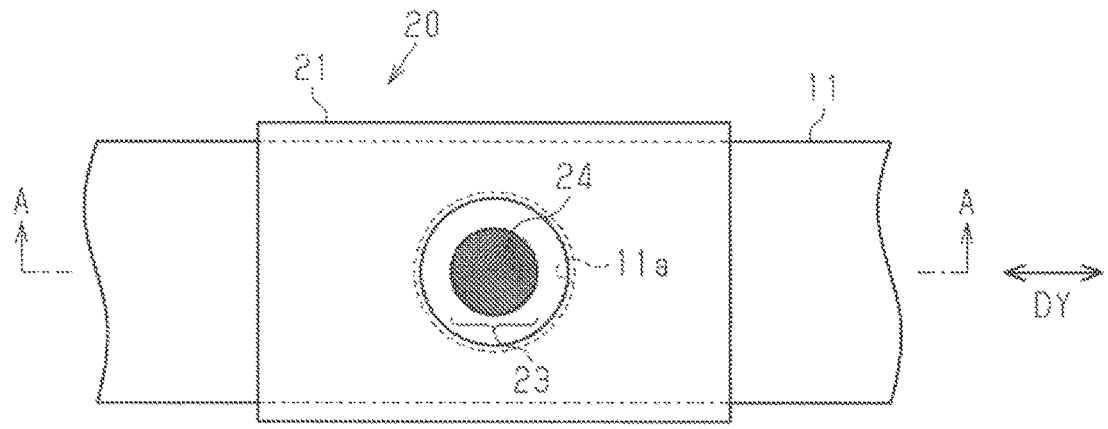
FIG. 2 is a plan view of the harness near a ventilation member.
Figure 3:
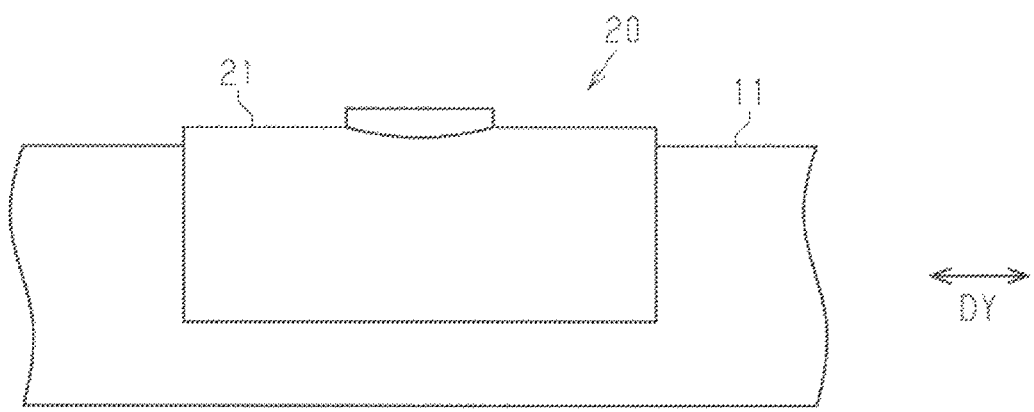
FIG. 3 is a side view of the harness near the ventilation member.

As shown in FIGS. 2 and 3, a ventilation member 20 is attached to the electric wire insertion tube 11 of the protective tube 10. The ventilation member 20 may be detachably attached to, fixed with an adhesive to, or fixed with a band or tape to the electric wire insertion tube 11.

The ventilation member 20 includes an attachment portion 21 (attachment) that can be attached to the electric wire insertion tube 11, and a connecting portion 22 (connection body) that is connected to the through hole 11a of the electric wire insertion tube 11. The ventilation member 20 is made of, for example, rubber or elastomer.

The attachment portion 21 is curved along the electric wire insertion tube 11. Preferably, the attachment portion 21 covers more than half of the electric wire insertion tube 11 in the circumferential direction of the electric wire insertion tube 11.

Figure 4:
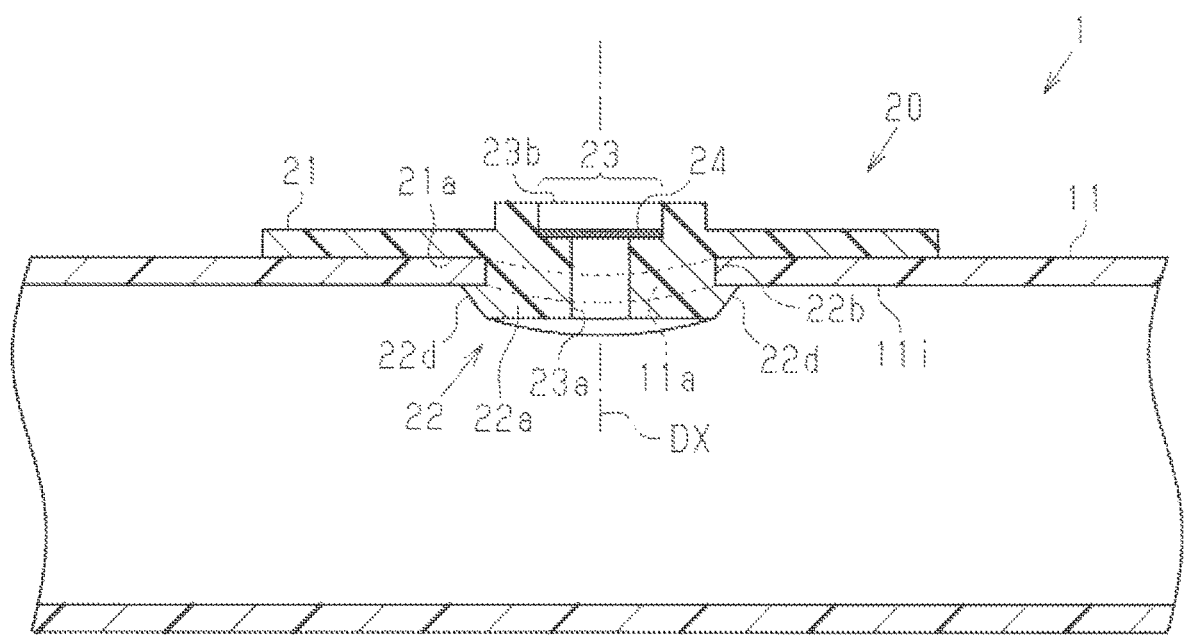
FIG. 4 is a cross-sectional view of the harness taken along a line A-A in FIG. 2.

As shown in FIG. 4, the connecting portion 22 is arranged at the center of the attachment portion 21. For example, the connecting portion 22 is arranged on the attachment portion 21, at about the center in the direction that is along the extending direction DY of the electric wire insertion tube 11, and at about the center in the direction that is orthogonal to the extending direction DY of the electric wire insertion tube 11. The connecting portion 22 projects from the inner face 21a of the attachment portion 21 so as to be inserted through the through hole 11a of the electric wire insertion tube 11. The connecting portion 22 has an insertion portion 22a that is inserted through the through hole 11a of the electric wire insertion tube 11, and catches 22d that project from the insertion portion 22a. The insertion portion 22a includes a fitting portion 22b that is fitted into the through hole 11a of the electric wire insertion tube 11.

The connecting portion 22 has a ventilation portion 23 that allows air to pass therethrough and is unlikely to allow water to pass therethrough. The ventilation portion 23 includes a communication hole 23a that is arranged at the insertion portion 22a and connects the inside and the outside of the electric wire insertion tube 11, and a ventilation filter 24 that covers the communication hole 23a. The communication hole 23a extends along a projecting direction DX, which is the projecting direction of the insertion portion 22a. The communication hole 23a has an air vent 23b that is arranged on the outer side of the electric wire insertion tube 11. The ventilation filter 24 allows air to pass therethrough, but does not allow water to pass therethrough.

The catches 22d of the connecting portion 22 engage with the inner face 11i of the electric wire insertion tube 11. The catches 22d project from the outer circumferential face of the insertion portion 22a. The catches 22d are arranged at least at two points, and preferably at four points on the insertion portion 22a.

Hereinafter, the actions and effects of the ventilation member 20 according to this embodiment will be described.

(1) The ventilation member 20 includes the attachment portion 21, and the connecting portion 22 that is connected to the through hole 11a. The connecting portion 22 has the ventilation portion 23 that allows air to pass therethrough and is unlikely to allow water to pass therethrough.

With this configuration, the ventilation member 20 can be attached to the through hole 11a of the electric wire insertion tube 11. Thus, the ventilation portion 23 can be arranged at the portion of the protective tube 10 at which the through hole 11a is arranged. That is to say, the ventilation portion 23 can be arranged at portions other than a portion around the connector 3. The portions at which the ventilation portion 23 can be arranged in the electric wire insertion tube 11 are wider than those in the connector 3, and thus the degree of freedom in arranging the ventilation portion 23 increases.

(2) The connecting portion 22 has the insertion portion 22a that is inserted through the through hole 11a of the electric wire insertion tube 11, and the catches 22d that project from the insertion portion 22a and engage with the inner face 11i of the electric wire insertion tube 11.

With this configuration, the ventilation member 20 is unlikely to separate from the electric wire insertion tube 11.

(3) The harness 1 includes the ventilation member 20 with the above-described configuration. Thus, air can be allowed to flow between the inside and the outside of the electric wire insertion tube 11 at the portion of the harness 1 to which the ventilation member 20 is attached. Note that the position at which the through hole 11a is formed in the electric wire insertion tube 11 can be set as appropriate according to the arrangement of the ventilation member 20.

Second Embodiment

Hereinafter, a harness 1x will be described with reference to FIG. 5.

The harness 1x has a ventilation member 30 with the following configuration. The ventilation member 30 can be attached to two through holes with different diameters.

The ventilation member 30 includes an attachment portion 31 that can be attached to the electric wire insertion tube 11, and a connecting portion 32, which will be described later. The connecting portion 32 includes a ventilation portion 35 that is similar to the ventilation portion 23 described in the first embodiment.

The connecting portion 32 has a first connecting part 33 (first connection) that can be connected to the through hole 11a with a first diameter, and a second connecting part 34 (second connection) that can be connected to a through hole 11b with a second diameter that is smaller than the first diameter.

The first connecting part 33 and the second connecting part 34 are arranged in the order of the first connecting part 33 and the second connecting part 34, from the attachment portion 31 side along the projecting direction DX of the connecting portion 32.

The first connecting part 33 has a first fitting portion 33a that is fitted into the through hole 11a with the first diameter, and first catches 33b that engage with the inner face 11i of the electric wire insertion tube 11 having the through hole 11a with the first diameter. The second connecting part 34 has a second fitting portion 34a that is fitted into the through hole 11b with the second diameter, and second catches 34b that engage with an inner face 11j of the electric wire insertion tube 11x having the through hole 11b with the second diameter.

In the projecting direction DX of the connecting portion 32, the distance between the first catches 33b and the second catches 34b, that is, the thickness of the second fitting portion 34a is preferably the same as the thickness of the tube wall of the electric wire insertion tube 11 having the through hole 11a with the first diameter. With this configuration, the tube wall of the electric wire insertion tube 11 is arranged between the first catches 33b and the second catches 34b, and the tube wall of the electric wire insertion tube 11 is held between the first catches 33b and the second catches 34b, and thus the ventilation member 30 is stably attached.

The ventilation member 30 is directly attached to the electric wire insertion tube 11 having the through hole 11a with the first diameter.

Figure 5:
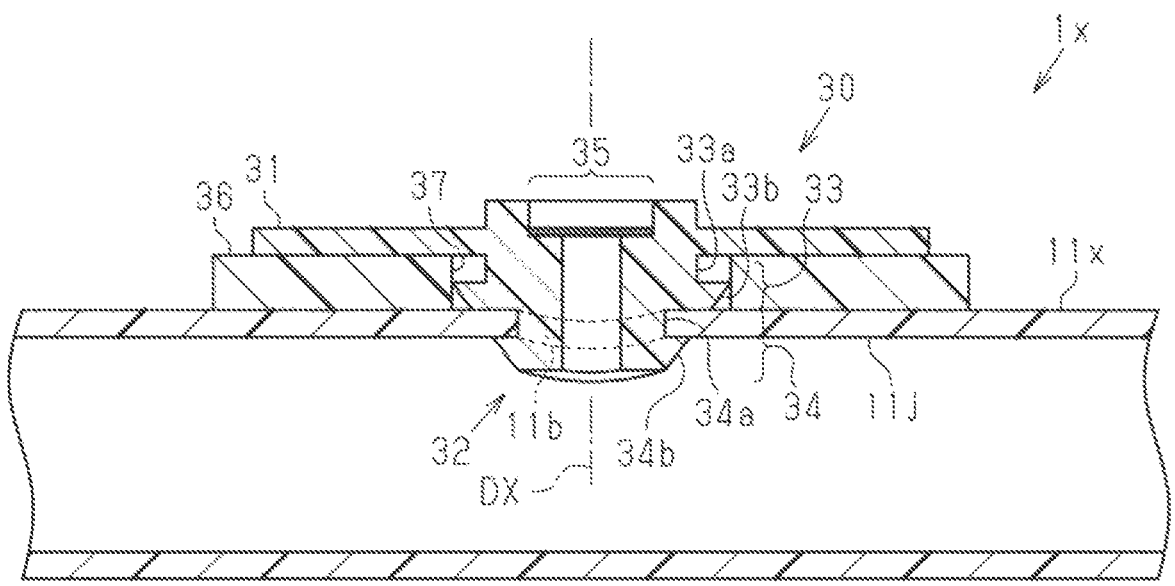
FIG. 5 is a cross-sectional view of a portion near a ventilation member of a harness according to a second embodiment.

As shown in FIG. 5, the ventilation member 30 is attached via a spacer 36 to the electric wire insertion tube 11x having the through hole 11b with the second diameter.

The spacer 36 has a fitting hole 37 into which the first connecting part 33 is fitted. The spacer 36 can be attached to the electric wire insertion tube 11x having the through hole 11b with the second diameter. The spacer 36 is arranged between the attachment portion 31 and the electric wire insertion tube 11x.

Hereinafter, the actions and effects of the ventilation member 30 and the harness 1x according to this embodiment will be described.

(1) The connecting portion 32 of the ventilation member 30 has the first connecting part 33 that can be connected to the through hole 11a with the first diameter, and the second connecting part 34 that can be connected to the through hole 11b with the second diameter. The first connecting part 33 and the second connecting part 34 are arranged along the projecting direction DX of the connecting portion 32. With this configuration, the ventilation member 30 can be attached to the electric wire insertion tube 11 having the through hole 11a with the first diameter, and to the electric wire insertion tube 11x having the through hole 11b with the second diameter.

(2) It is preferable that the connecting portion 32 of the ventilation member 30 includes the first catches 33b that are arranged on the first connecting part 33, and the second catches 34b that are arranged on the second connecting part 34. With this configuration, the ventilation member 30 is unlikely to separate from the electric wire insertion tube 11.

(3) It is preferable that the ventilation member 30 further includes the spacer 36 with the above-described configuration. Accordingly, the ventilation member 30 can be attached via the spacer 36 to the electric wire insertion tube 11x. Thus, it is possible to suppress the wobbling of the ventilation member 30 that occurs when the ventilation member 30 is attached to the electric wire insertion tube 11x.

OTHER EMBODIMENTS

The ventilation member and the harness are not limited to those in examples of the foregoing embodiments. Below, other embodiments of the ventilation member will be described.

Hereinafter, a harness 1y will be described with reference to FIG. 6.

The harness 1y has a ventilation member 40 with the following configuration.

Although the ventilation portion 23 is arranged on the connecting portion 22 in the first embodiment, in this embodiment, a ventilation portion 46 is provided as a separate member on a connecting portion 42.

For example, the connecting portion 42 is arranged at the center of an attachment portion 41, and projects from an inner face 41a of the attachment portion 41 so as to be inserted through the through hole 11a of the electric wire insertion tube 11. The connecting portion 42 includes an insertion portion 42a that is inserted through the through hole 11a, and a filter member 45 including the ventilation portion 46. The insertion portion 42a includes a fitting portion 42b that is fitted into the through hole 11a. The insertion portion 42a includes a screw hole 42c into which the filter member 45 is screwed. A screw 45a that engages with the screw hole 42c is arranged on the outer circumference of the filter member 45. The filter member 45 includes a communication hole 48 elongated in the axial direction, and a ventilation filter 47 is arranged so as to cover the communication hole 48. With this configuration, the filter member 45 can be replaced. Furthermore, the filter member 45 can be in the shape of a tube with the long elongated communication hole 48. One end of the tube-like filter member 45 is connected to the screw hole 42c of the insertion portion 42a. With this tube-like filter member 45, the air vent at the other end (portion on the side opposite to the portion that is connected to the insertion portion 42a) can be arranged away from the electric wire insertion tube 11.

Figure 7:
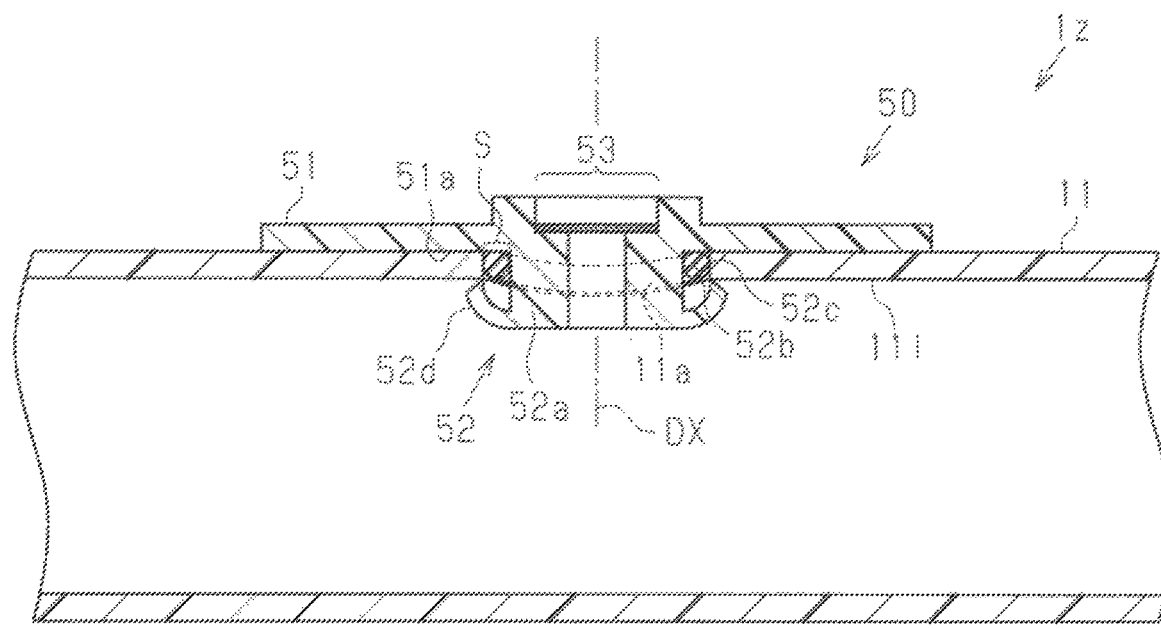
FIG. 7 is a cross-sectional view of a portion near a ventilation member of a harness according to another embodiment.

Hereinafter, a harness 1z will be described with reference to FIG. 7.

The harness 1z has a ventilation member 50 with the following configuration.

Although the ventilation member 20 is made of rubber or elastomer in the first embodiment, it also may be made of a resin (hereinafter, also referred to simply as a "plastic resin") that is less likely to be deformed than rubber or elastomer. In this embodiment, an example of the ventilation member 50 made of a plastic resin will be described.

The ventilation member 50 includes an attachment portion 51 that can be attached to the electric wire insertion tube 11, and a connecting portion 52 that is connected to the through hole 11a of the electric wire insertion tube 11. The ventilation member 50 is made of a plastic resin. The connecting portion 52 is arranged at the center of the attachment portion 51, and projects from an inner face 51a of the attachment portion 51 so as to be inserted through the through hole 11a of the electric wire insertion tube 11. The connecting portion 52 has an insertion portion 52a that is inserted through the through hole 11a of the electric wire insertion tube 11, and catches 52d that project from the insertion portion 52a. The insertion portion 52a includes a ventilation portion 53 that is similar to the ventilation portion 23 described in the first embodiment.

The portion of the insertion portion 52a that is positioned at the through hole 11a of the electric wire insertion tube 11 when the ventilation member 50 is attached to the electric wire insertion tube 11 (hereinafter, referred to as a "through hole corresponding portion 52b") is smaller than the through hole 11a. That is to say, when the ventilation member 50 is attached to the electric wire insertion tube 11, there is a gap S between the through hole corresponding portion 52b and the through hole 11a. The gap S is a space through which the catches 52d are inserted. A sealing member 52c (e.g., an elastic rubber member) for filling the gap S is attached to the through hole corresponding portion 52b.

Furthermore, the catches 52d of the connecting portion 52 engage with the inner face 11i of the electric wire insertion tube 11. The catches 52d are arranged at the outer circumferential face of the insertion portion 52a, and extend outward in the radial direction of the insertion portion 52a, toward the outer side in the projecting direction DX of the connecting portion 52. The catches 52d come into contact with the through hole 11a and are deformed so as to be closed when the connecting portion 52 is being inserted through the through hole 11a of the electric wire insertion tube 11, and open when the connecting portion 52 has passed through the through hole 11a. The front ends of the catches 52d are in contact with the inner face 11i of the electric wire insertion tube 11. Also with this ventilation member 50, the effects similar to those of the first embodiment can be achieved.

The ventilation members 20, 30, 40, and 50 of this disclosure may be referred to as non-electric ventilators. The communication holes 23a and 48 of the ventilation members function as ventilation holes. There is no limitation on the ventilation filter 24, but it may be a membrane filter.

In some examples, the attachment portion 21 and the connecting portion 22 may be configured as a sealing main body formed in one piece. For example, the ventilation member 20 of FIG. 4 includes a sealing main body that may be made of a synthetic resin formed in one piece, and the ventilation filter 24 fixedly connected to the sealing main body, and different portions of the sealing main body are configured as the attachment portion 21 and the connecting portion 22. The attachment portion 21 and the connecting portion 22 are located away from each other along the axial line of the communication hole 23a (the projecting direction DX or the thickness direction of the electric wire insertion tube 11 in the drawing) so as to define the fitting portion 22b that may be a groove between the attachment portion 21 and the connecting portion 22. The attachment portion 21 may be referred to as an outer lip or a seal lip that radially spreads apart along the axial line of the communication hole 23a. The connecting portion 22 may be referred to as an inner protrusion or a positioning protrusion that prevents the ventilation member 20 from separating from the electric wire insertion tube 11, by radially projecting along the axial line of the communication hole 23a so as to elastically engage with the inner face 11i of the electric wire insertion tube 11. The same applies to the attachment portions 31 and 51 and the connecting portions 32 and 52 in FIGS. 5 and 7.

Figure 6:
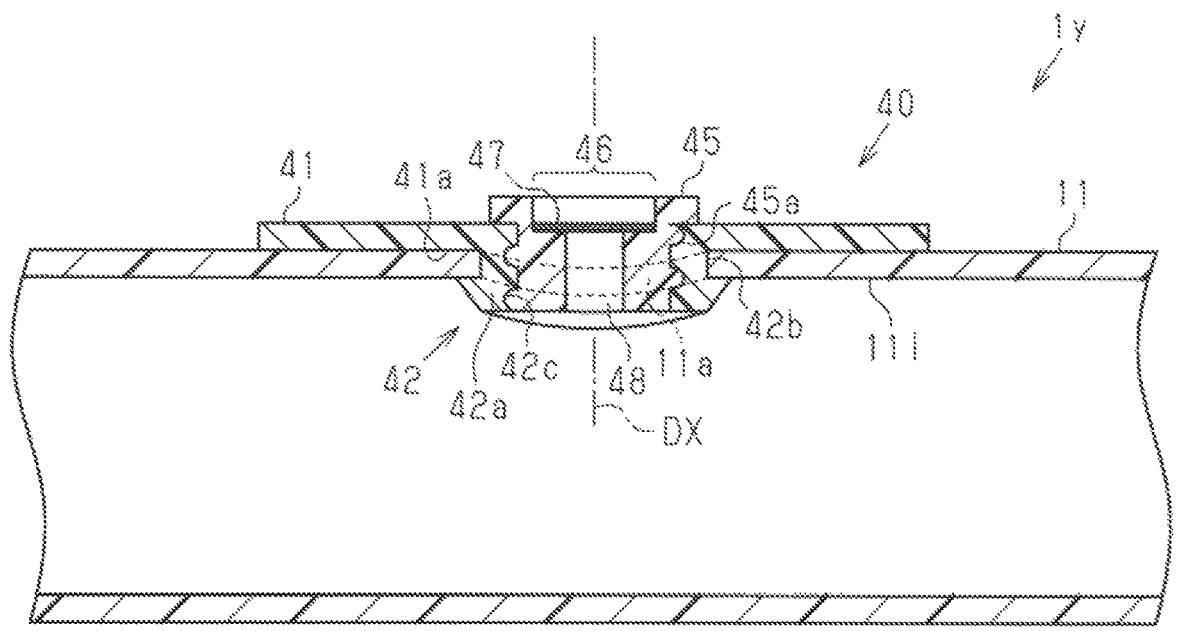
FIG. 6 is a cross-sectional view of a portion near a ventilation member of a harness according to another embodiment.

The filter member 45 in FIG. 6 may be referred to as a filter support tube. Accordingly, the ventilation member 40 in FIG. 6 includes a single sealing main body that may be made of a synthetic resin formed in one piece, a filter support tube 45 that may be made of a synthetic resin formed in one piece and that is detachably attached to the sealing main body, and the ventilation filter 47 fixedly connected to the filter support tube 45. The attachment portion 41 and the connecting portion 42 are located away from each other along the axial line of the communication hole 48 (the projecting direction DX or the thickness direction of the electric wire insertion tube 11 in the drawing) so as to define the fitting portion 42b that may be a groove between the attachment portion 41 and the connecting portion 42. The attachment portion 24 may be referred to as an outer sealing lip or the outer side of the sealing main body that radially spreads apart along the axial line of the communication hole 48. The connecting portion 42 may be referred to as an inner protrusion or a positioning protrusion that prevents the ventilation member 40 from separating from the electric wire insertion tube 11, by radially projecting along the axial line of the communication hole 48 so as to elastically engage with the inner face 11i of the electric wire insertion tube 11.

The present disclosure encompasses the following implementation examples. The reference numerals of the constituent elements of the embodiments are indicated not for limitation but for facilitating the understanding.

[Note 1]

In some implementation examples, a ventilation member (20; 30; 40; 50) is used together with an electric wire protective tube (11) including a tube wall that defines a hollow space for protecting at least one electric wire (2) and a through hole (11a) that is formed through the tube wall. The ventilation member (20; 30; 40; 50) is a non-electric ventilator configured to be attached to the through hole (11a) of the electric wire protective tube (11).

[Note 2]

In some implementation examples, the ventilation member (20; 30; 50) includes a sealing main body (21, 22; 31, 32; 51, 52) configured to be attached to the through hole (11a) of the electric wire protective tube (11) from the outside of the electric wire protective tube (11) and including a ventilation hole (23a), and ventilation filter (24) fixedly connected to the sealing main body across the ventilation hole (23a).

[Note 3]

In some implementation examples, the ventilation member (40) includes a sealing main body (41, 42) configured to be attached to the through hole (11a) of the electric wire protective tube (11) from the outside of the electric wire protective tube (11), a filter support tube (45) detachably attached to the sealing main body and including a ventilation hole (48), and a ventilation filter (47) fixedly connected to the filter support tube (45) across the ventilation hole (48).

[Note 4]

In some implementation examples, the sealing main body is made of a synthetic resin formed in one piece.

[Note 5]

In some implementation examples, the sealing main body includes an outer lip (21; 31; 41; 51) and an inner protrusion (22; 32; 42; 52) that are located away from each other along an axial line of the ventilation hole (23a; 48) so as to define a groove (22b; 42b) between the outer lip and the inner protrusion, and, when the ventilation member (20; 30; 40; 50) is attached to the through hole (11a) of the electric wire protective tube (11), the groove (22b; 42b) is in close contact with a hole face of the through hole (11a) of the electric wire protective tube (11), the outer lip (21; 31; 41; 51) is arranged on an outer side of the electric wire protective tube (11), and the inner protrusion (22; 32; 42; 52) elastically engages with an inner face (11i) of the electric wire protective tube (11).

[Note 6]

In some implementation examples, the outer lip (21; 31; 41; 51) and the inner protrusion (22; 32; 42; 52) are configured in cooperation with each other to elastically sandwich the electric wire protective tube (11) in a thickness direction (DX) of the electric wire protective tube (11).

[Note 7]

In some implementation examples, the ventilation member (30) further includes a spacer ring (36) arranged coaxially with the through hole (11a) of the electric wire protective tube (11), between the outer lip (31) and an outer face of the electric wire protective tube (11).

[Note 8]

In some implementation examples, the ventilation member (20; 30; 40; 50) is configured as a wire harness ventilator that forms a wire harness (1) in cooperation with at least one electric wire (2), the electric wire protective tube (11) for protecting the at least one electric wire (2), and an electrical connector (3) connected to an end of the at least one electric wire (2).

It will be appreciated by those skilled in the art that the present disclosure may be embodied in other specific modes without departing from the technical idea thereof. For example, some of constituent elements described in the embodiment (or one or a plurality modes thereof) may be omitted or combined.

The invention claimed is:

1. A ventilation member comprising:
an attachment that can be attached to an electric wire insertion tube having a first through hole with a first diameter, or a second through hole with a second diameter that is smaller than the first diameter; and
a connection body that extends from the attachment in a projecting direction and is connected to the first through hole, the connection body including:
ventilation that allows air to pass and prevents water from passing through the connection body, the ventilation including a filter having an outermost surface that is entirely exposed, the outermost surface facing in a direction opposite of the projecting direction of the connection body,
a first connection that can be connected to the first through hole with the first diameter,
a first catch that projects from the first connection and is configured to engage an inner face of the electric wire insertion tube having the first through hole with the first diameter,
a second connection that can be connected to the second through hole with the second diameter that is smaller than the first diameter, and
a second catch that projects from the second connection and is configured to engage an inner face of the electric wire insertion tube having the second through hole with the second diameter,
wherein the first connection and the second connection are arranged along the projecting direction of the connection body.

2. A harness comprising:
the ventilation member according to claim 1;
an electric wire insertion tube including the ventilation; and
an electric wire that is inserted through the electric wire insertion tube.

3. A ventilation member comprising:
an attachment that can be attached to an electric wire insertion tube having a first through hole with a first diameter, or a second through hole with a second diameter that is smaller than the first diameter; and
a connection body that extends from the attachment in a projecting direction and is connected to the first through hole, the connection body including:
ventilation that allows air to pass and prevents water from passing through the connection body, the ventilation including a filter having an outermost surface that is entirely exposed, the outermost surface facing in a direction opposite of the projecting direction of the connection body,
a first connection that can be connected to the first through hole with the first diameter, and
a second connection that can be connected to the second through hole with the second diameter that is smaller than the first diameter, and
a spacer that is configured to be arranged between the attachment and the electric wire insertion tube having the second through hole with the second diameter,
wherein:
the first connection and the second connection are arranged along the projecting direction of the connection body, and
the spacer has a fitting hole into which the first connection is fitted, and can be attached to the electric wire insertion tube having the second through hole with the second diameter.

4. The ventilation member according to claim 3, wherein the connection body includes a first catch that projects from the first connection and is configured to engage an inner face of the electric wire insertion tube having the first through hole with the first diameter, and a second catch that projects from the second connection and is configured to engage an inner face of the electric wire insertion tube having the second through hole with the second diameter.

5. A harness comprising:
the ventilation member according to claim 3;
an electric wire insertion tube including the ventilation; and
an electric wire that is inserted through the electric wire insertion tube.

* * * * *